Sept. 30, 1958 L. J. BISHOP ET AL 2,853,955
CONVEYOR SYSTEM
Filed Sept. 22, 1952 8 Sheets-Sheet 1

Fig. 1

INVENTORS
LEONARD J. BISHOP
PAUL KLAMP
BY
Whittemore, Hulbert & Belknap
ATTORNEYS Sept. 30, 1958  L. J. BISHOP ET AL  2,853,955
CONVEYOR SYSTEM Filed Sept. 22, 1952  8 Sheets-Sheet 3

INVENTORS
LEONARD J. BISHOP
PAUL KLAMP
BY
Whittemore, Hulbert & Belknap
ATTORNEYS

Sept. 30, 1958 L. J. BISHOP ET AL 2,853,955
CONVEYOR SYSTEM
Filed Sept. 22, 1952 8 Sheets-Sheet 5

INVENTORS
LEONARD J. BISHOP
PAUL KLAMP
BY
Whittemore, Hulbert & Belknap
ATTORNEYS

FIG. 13

United States Patent Office 2,853,955
Patented Sept. 30, 1958

2,853,955
CONVEYOR SYSTEM

Leonard J. Bishop, Birmingham, and Paul Klamp, Detroit, Mich., assignors to Mechanical Handling Systems, Inc., Detroit, Mich., a corporation of Michigan Application September 22, 1952, Serial No. 310,856

4 Claims. (Cl. 104—88)

This invention relates to conveyors of the monorail type having power driven work advancing trolleys which are movable along a top track and having work carrying trolleys which are movable along a main bottom track by the work advancing trolleys.

More particularly, the present invention concerns itself with conveyors of the above general type having means for switching a work carrying trolley from a position on the main track to a position on a branch or free line track where additional operations may be performed on the work supported by the work carrying trolley on the branch track without interrupting travel of work carrying trolleys along the main track.

With the above in view, it is an object of the present invention to provide a conveyor having means associated with the branch track for transferring a work carrying trolley on the branch track to a position on the main track where it may be engaged by an approaching work advancing trolley and moved along the main track.

It is another object of this invention to provide a conveyor structure of the above general type with means for operating the transfer means in timed relationship to the presence of an unloaded work advancing trolley on the main track so that there is no danger of moving a work carrying trolley from a position on the branch track to a position on the main track at a time when the work carrying trolley would interfere with a similar trolley being advanced along the main track of the conveyor. The construction is such that a waiting work carrying trolley on the branch track is transferred back to the main track immediately in advance of an oncoming unloaded work advancing trolley so that the latter is coupled to the work carrying trolley to advance the latter along the main track.

The foregoing, as well as other objects, will be made more apparent as this description proceeds especially when considered in connection with the accompanying drawings, wherein.

Figure 5:
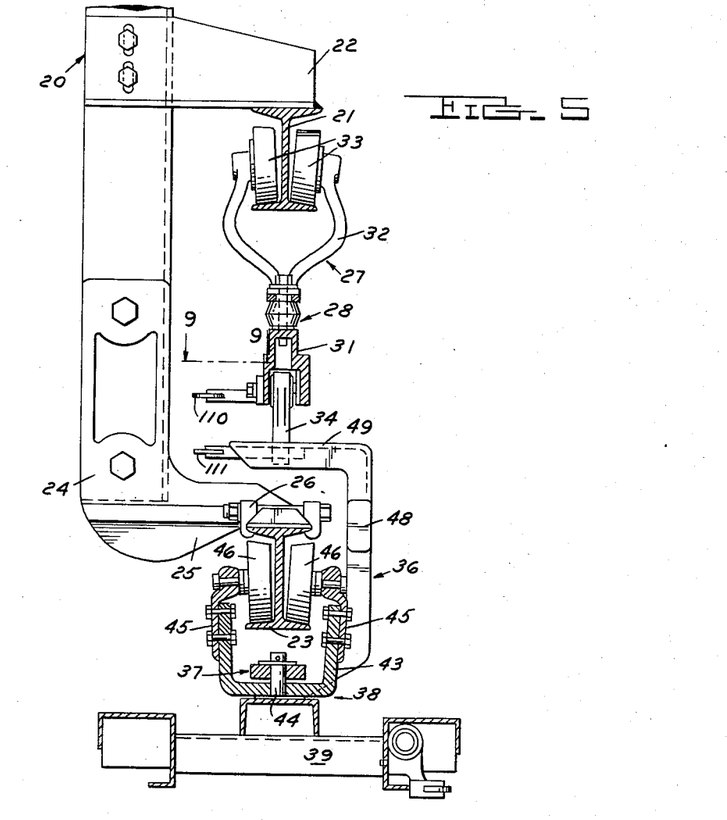
Figure 5 is a sectional view taken substantially on the plane indicated by the line 5—5 of Figure 4.

The conveyor selected herein for the purpose of illustration is of the mono-rail type having a frame 20 suitably supported by the overhead structure of the building within which the conveyor is installed. An upper track 21, I-shaped in cross section, is secured to the frame 20 at one side thereof by laterally extending frame members 22, and a bottom track 23, also I-shaped in cross section, is secured to the frame 20 at the same side of the latter as the track 21. In the present instance, the bottom track 23 is spaced below the upper track 21 in vertical alignment with the latter and is connected to the frame 20 by brackets 24. As shown in Figure 5 of the drawings, each bracket 24 has a laterally extending projection 25 equipped with suitable clamps 26 for engagement with the top flange of the bottom track 23.

The top track 21 forms a support and a guide rail for a plurality of work advancing trolleys 27. The trolleys 27 are propelled along the upper track 21 by a link type chain 28 which is diagrammatically shown in Figure 12 of the drawings as driven by an endless chain 29. The chain 29 is not shown in detail herein as it forms no part of the present invention and it will suffice to point out that this chain has lugs which successively mesh with the links of the chain 28 at one side of the latter to impart movement thereto. The chain 29 is power driven by a suitable electrically operated motor 30 illustrated in Figures 12 and 13 of the drawings.

Figure 4:
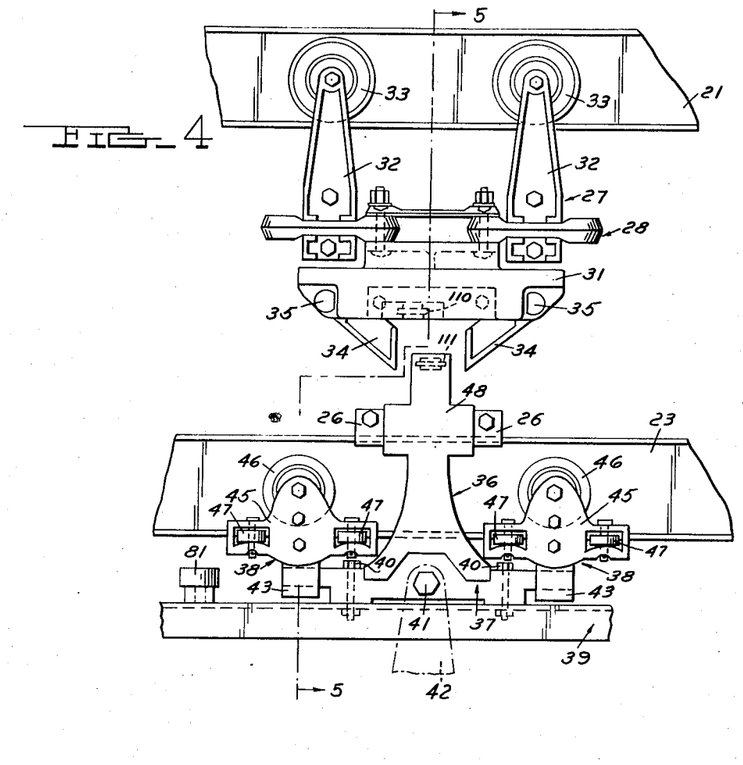
Figure 4 is a fragmentary side elevational view of a part of the conveyor.

In Figures 4 and 5 of the drawings, a typical work advancing trolley 27 is illustrated and it will be noted that this trolley embodies a load bar 31 which is channel-shaped in cross section and is secured to the under side of the chain 28 with the channel opening downwardly. The chain 28 is supported from the upper track 21 by hangers 32 respectively secured to the chain 28 adjacent opposite ends of each load bar 31. The hangers 32 extend in an upward direction from the chain 28 and each hanger has laterally spaced arms which straddle the upper track 21 and respectively support rollers 33. The rollers 33 are positioned to engage the top surface of the bottom flange of the track 21 at opposite sides of the web of the track in the manner clearly shown in Figure 5 of the drawings.

Referring again to Figures 4 and 5 of the drawings it will be noted that a pair of dogs 34 are carried by the load bar 31. The upper ends of the dogs 34 respectively project into the channel of the load bar 31 adjacent opposite ends of the latter and are pivoted to the load bar by pins 35. The lower ends of the dogs 34 extend below the bottom of the load bar 31 and are weighted so that the dogs are normally held in the relative positions thereof shown in Figure 4 of the drawings. The purpose of the dogs 34 is to advance a load carrying trolley 36 along the bottom track 23 and the manner in which this is accomplished will be more fully hereinafter described.

Although a plurality of load carrying trolleys 36 are supported by the bottom track 23, nevertheless, only one is shown in detail herein. This load carrying trolley 36 comprises a load bar 37, hangers 38 and a bumper frame 39. The load bar 37 is positioned directly below the bottom track 23 and is secured to the top of the bumper frame 39 intermediate the ends thereof by fastener elements 40. The center portion of the bar 37 between the hangers 38 is fashioned to support a pin 41 which extends transversely of the bar 37 and provides a mounting for a work carrying hanger 42.

The hangers 38 comprise U-shaped members 43 and the base portions of the members 43 are respectively pivotally connected to opposite ends of the load bar 37 by vertical pins 44. As shown in Figure 5, the base portions of the members 43 respectively project beneath the opposite ends of the bar 37 and the lower ends of the pins 44 are secured to the base portions of the members 43. The upper ends of the pins 44 project through openings formed in the adjacent portions of the bar 37, in a manner to enable limited pivotal movement of the hangers 38 about the axes of the vertical pins 44.

It will also be noted from Figure 5 of the drawings that plates 45 are respectively secured to the upstanding legs of the U-shaped members 43 and the upper ends of the plates straddle the bottom track 23. Suitable rollers 46 are respectively rotatably supported on the upper ends of the plates 45 in positions to engage the top surface of the bottom flange of the track 23 at opposite sides of the web of said track. As shown in Figure 4 of the drawings, a pair of rollers 47 is supported on each plate 45 for rotation about vertical axes and these rollers are positioned to engage opposite longitudinal edges of the bottom flange of the track 23 in order to restrict lateral shifting movement of the trolley 36 relative to the track 23.

It will further be noted from Figures 4 and 5 of the drawings that the load bar 37 has an arm 48 which extends upwardly therefrom intermediate the ends thereof. The arm 48 is located at the side of the bottom track 23 opposite the brackets 24 and the upper end 49 of the arm 48 extends laterally over the top of the track 23 in a direction toward the brackets 24. The projection 49 at the upper end of the arm 48 is adapted to extend between the pusher dogs 34 for engagement by one of the dogs depending upon the direction of movement of the trolley 27 along the track 21. Thus, it will be noted that the trolley 27 advances the trolley 36 and associated work parts along the bottom track 23.

The conveyor has a plurality of free lines or branch track sections located to one side of the main track 23 and also has a corresponding number of switch sections enabling the transfer of work carrying trolleys 36 from the branch track sections to the main track. One branch track section and the associated switch section of the main track are disclosed in Figures 1 and 12 of the drawings. In detail, it will be noted that the main track 23 comprises aligned main sections 50 and 51 having the adjacent ends spaced from each other. Supported to one side of the track section 51 is a curved branch track section 52 having one end terminating at a position adjacent the free end of the track section 51. A switch track section 53 normally bridges the space between the adjacent ends of the main track sections 50 and 51. One end of the switch track section 53 is pivoted to the free end of the main track section 50 by a pin 54 in a manner to enable swinging the switch track section 53 alternately to positions wherein the free end thereof registers with the track sections 51 and 52.

Figure 1:
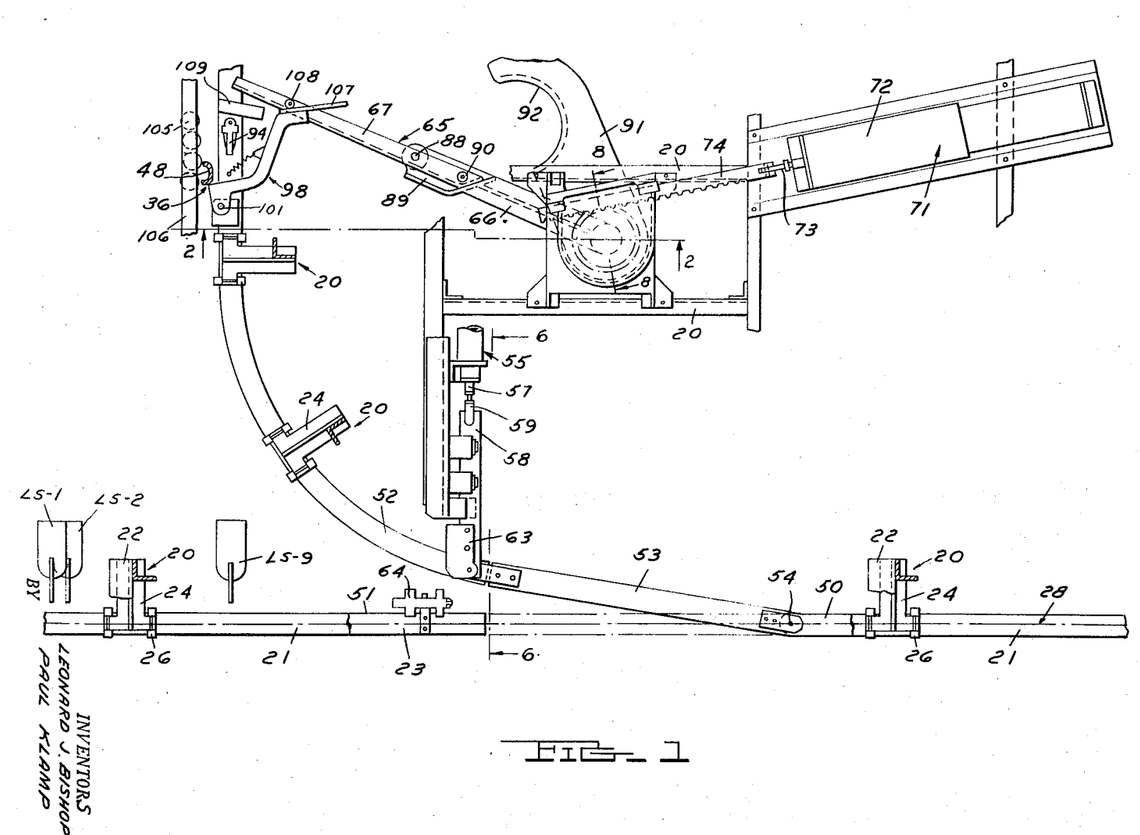
Figure 1 is a fragmentary plan view of a part of a conveyor embodying the features of this invention.
Figure 6:
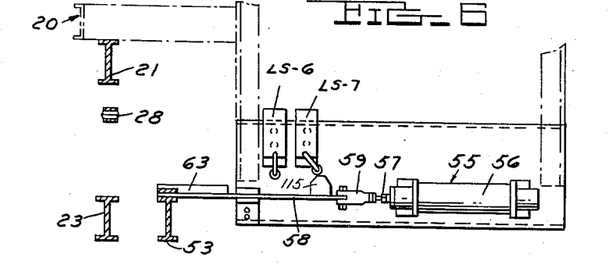
Figure 6 is a sectional view taken substantially on the line 6—6 of Figure 1.
Figure 12:
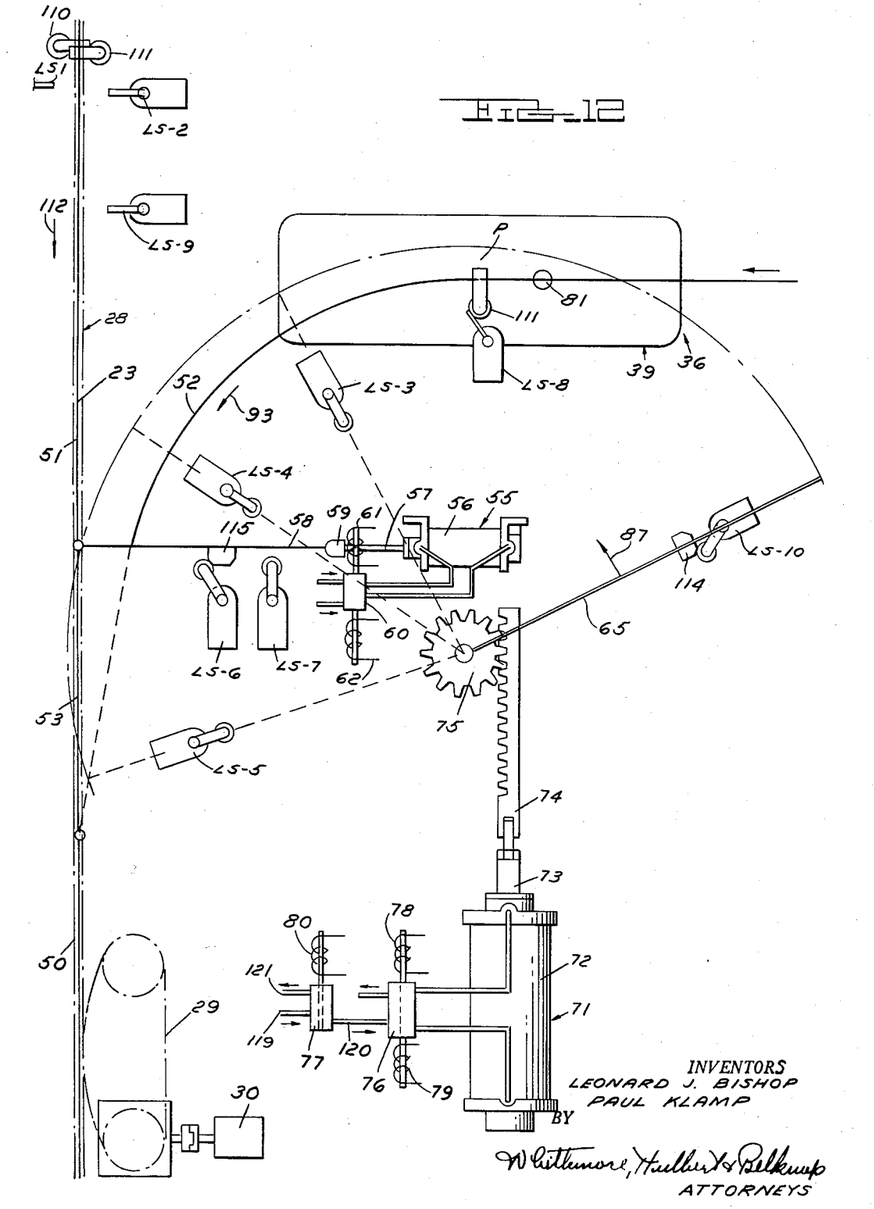
Figure 12 is a semi-diagrammatic elevational view of the conveyor structure shown in Figure 1.

The switch section 53 is operated by a fluid motor 55, shown in Figures 1, 6 and 12 of the drawings. The fluid motor 55 has a cylinder 56 and a piston (not shown) slidably supported in the cylinder. The cylinder 56 is suitably supported at the same side of the main track 23 as the branch track section 52 and the piston in the cylinder is connected to the inner end of a rod 57 having the outer end pivotally connected to a bar 58 by a clevis 59. The bar 58 is also pivotally connected to the switch track section 53 adjacent the swinging end thereof so that movement of the piston within the cylinder 56 imparts a swinging movement to the switch track section 53.

The operation of the fluid motor 55 to swing the switch track section 53 between positions wherein the free end of the switch track section respectively registers with the track sections 51 and 52 is accomplished by a four-way valve 60. The four-way valve 60 is shown in Figure 12 of the drawings as operated by a pair of solenoids 61 and 62. The solenoid 61 operates the valve 60 to effect swinging movement of the track section 53 into registration with the branch track section 52 and the solenoid 62 serves to return the swinging track section 53 into registration with the fixed main track section 51. The solenoids 61 and 62 are alternately energized through the medium of the electric circuit shown in Figure 13 which will be more fully hereinafter described.

As shown particularly in Figures 1 and 6 of the drawings, it will be noted that the inner end of the bar 58 is pivoted to the top flange of the track switch section 53 and has a part 63 which overlies the top flange of the branch track section 52 in both positions of the switch section 53. The construction is such that part 63 acts as a stop to prevent accidental movement of the trolleys 36 off of the branch track section 52 when the switch section 53 registers with the main track section 51. The numeral 64 designates a stop which is secured to the top flange of the main track section 51 adjacent the free end of this section in a position to prevent accidental movement of the trolleys 36 off the main track section 51 when the switch track section 53 is in registration with the branch track section 52. The stops 63 and 64 are shown in detail in the copending application of Paul Klamp and Gerald E. Perkins, Serial No. 309,637, filed September 15, 1952.

Figures 2, 3:
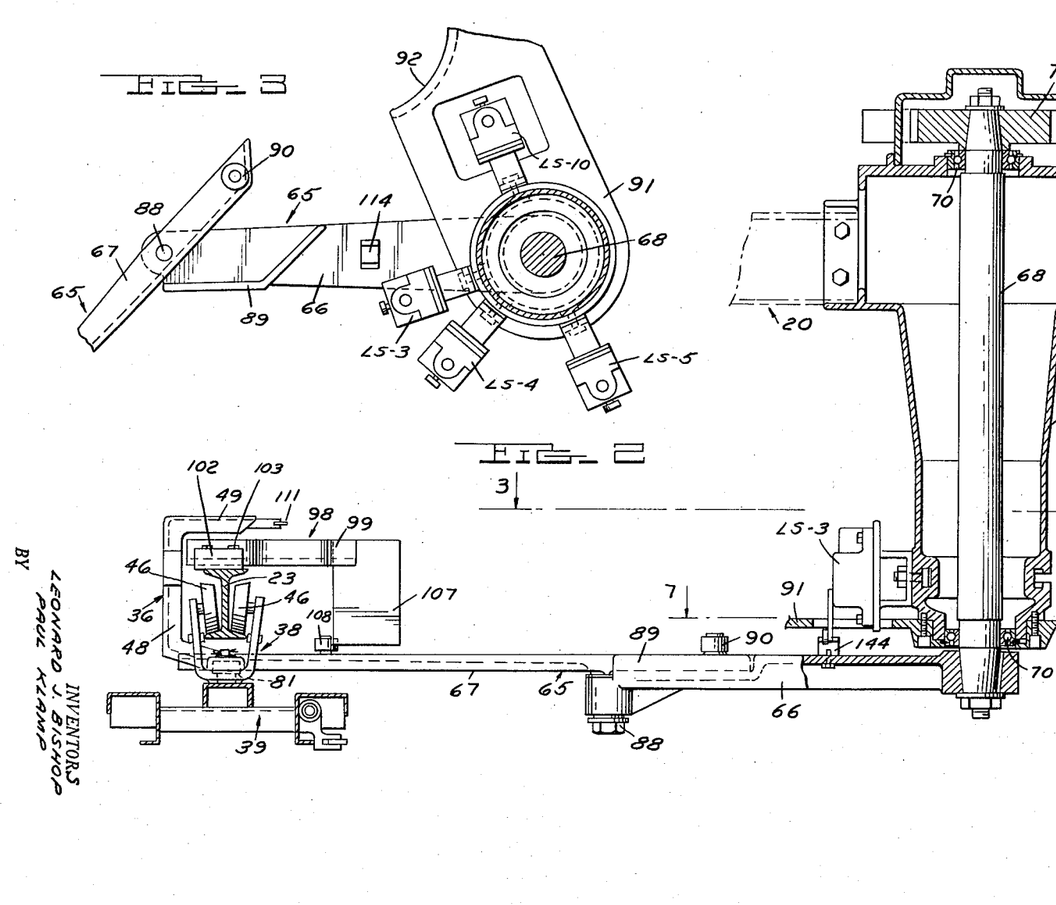
Figure 2 is a sectional view taken substantially on the line 2—2 of Figure 1.
Figure 3 is a sectional view taken substantially on the line 3—3 of Figure 2.
Figures 7, 8, 9:
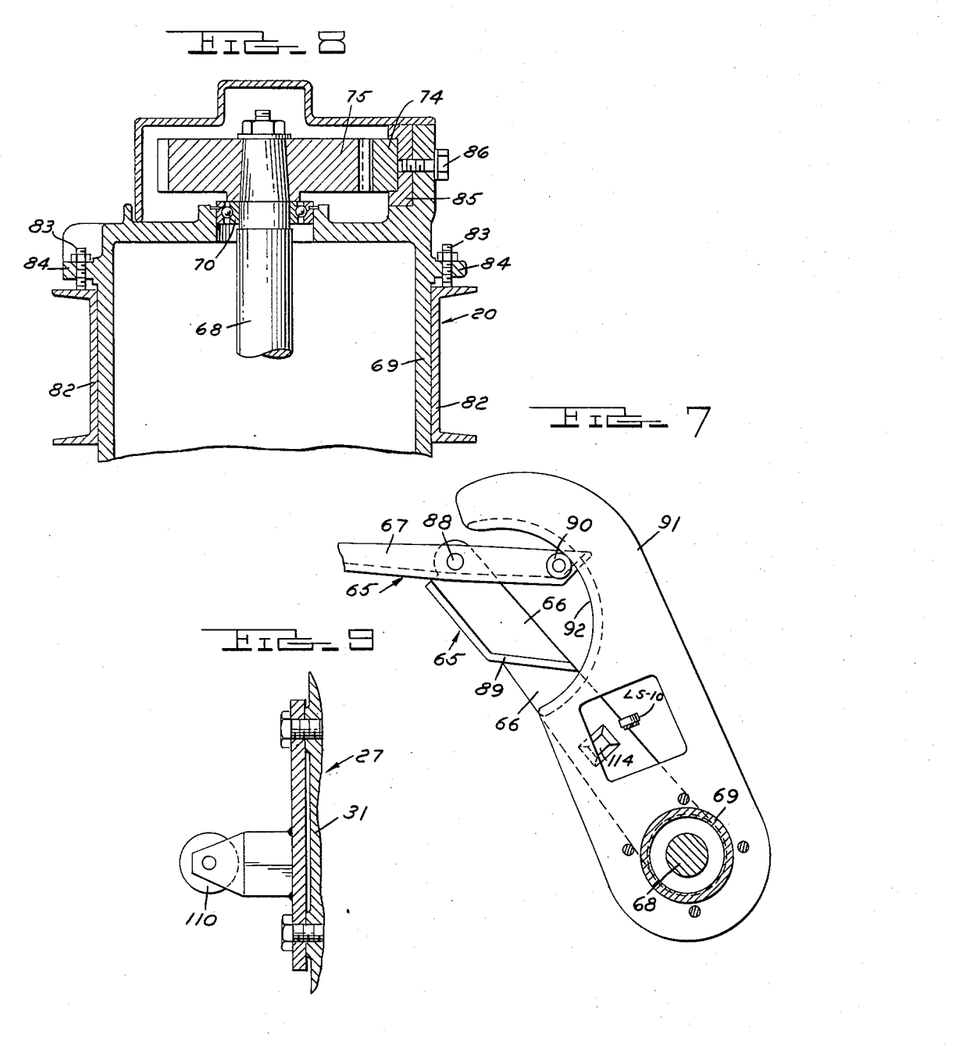
Figure 7 is a sectional view taken on the line 7—7 of Figure 2.
Figure 8 is a sectional view taken on the line 8—8 of Figure 1.
Figure 9 is a sectional view taken substantially on the line 9—9 of Figure 5.

In accordance with the present invention, a load carrying trolley 36 on the branch track 52 is moved from a position on the branch track to a position on the main track 23 by a transfer arm 65 shown in Figures 1, 2 and 7 as comprising two sections 66 and 67. The inner end of the section 66 is secured to the lower end of a spindle 68 extending vertically through a housing 69 and having the opposite ends journalled in bearings 70 carried by the housing 69. Thus, the spindle 68 is rotatably supported on the housing 69 and rotation of the spindle in opposite directions is accomplished by a fluid motor 71 shown in Figures 1 and 12 of the drawings. The fluid motor 71 comprises a cylinder 72 and a piston (not shown) slidably supported within the cylinder 72. The piston is connected to an operating rod 73 which in turn is connected to the inner end of a rack 74. The rack 74 meshes with a pinion 75 secured to the upper end of the vertical spindle 68 in a manner such that the movement of the piston of the fluid motor 71 in opposite directions in the cylinder 72 imparts a rotative movement to the spindle 68 together with the arm 65 in opposite directions.

The operation of the fluid motor 71 is controlled by a four-way valve 76 and a three-way valve 77. The four-way valve 76 is alternately operated to effect movement of the piston in opposite directions in the cylinder 72 by a pair of solenoids 78 and 79. The three-way valve 77 is operated by a solenoid 80 and the purpose of this valve will be more fully hereinafter described.

The housing 69 is supported on the frame structure 20 in a position to enable engagement of the outer end of the arm 65 with a roller 81 supported on the bumper frame 39 of a work carrying trolley 36, as shown in Figure 4 of the drawings. Referring now to Figure 8 of the drawings, it will be noted that the housing 69 is positioned between frame members 82 of the frame structure 20 and may be vertically adjusted to locate the arm 65 at the proper elevation by leveling screws 83. The screws 83 are carried by laterally outwardly extending ears 84 on the housing 69 and the lower ends of the screws respectively engage the top surfaces of the frame members 82. It will also be noted from Figure 8 of the drawings that the rack 74 is slidably supported in a guide 85 which is secured to the housing 69 at the upper end thereof by studs 86.

It follows from the foregoing that rotation of the transfer arm 65 in the direction of the arrow 87 in Figure 12 engages the free end of the arm 65 with the roller 81 on a trolley 36 to advance the trolley along the branch track 52 to a position on the main track 23. As will be presently described, the switch track section 52 is moved from its straight line position in registration with the main track section 51 to a position in registration with the branch track section 52 in timed relation to swinging movement of the arm 65 in a direction to transfer a trolley 36 from the branch track section 52 to the main track 23. The timing is such that the switch track section 53 is in registration with the branch track section 52 before the trolley 36 reaches the end of the branch track section 52. It will also be noted from the following description that movement of a trolley 36 from the branch track section 52 to the main track 23 is accomplished only at a time when the approaching driving trolley 27 on the track 21 is free or unloaded.

After a trolley 36 on the branch track section 52 is transferred to the main track 23 by the arm 65, the latter is returned to its initial starting position shown in Figure 12 of the drawings. In some instances a second work carrying trolley 36 is moved to the position shown in Figure 12 before the transfer arm 65 reaches its initial starting position and hence provision must be made for swinging the arm 65 past the roller 81 on the trolley 36.

In the present instance, the above is accomplished by pivoting the section 67 of the arm 65 to the outer end of the section 66 by a pin 88, as shown particularly in Figure 7 of the drawings. Thus, should the free end of the section 67 engage a roller 81 on a trolley 36 during return movement of the transfer arm 65, the section 67 swings about the pin 88 to enable movement of the transfer arm beyond the roller 81 to the initial starting position of the transfer arm.

Swinging movement of the section 67 in the opposite direction is prevented by a stop 89 projecting upwardly from the outer end of the section 66 at the leading edge thereof in a position to abut the adjacent edge of the inner end portion of the section 67. The inner end of the section 67 has a roller 90 supported at the top thereof in a position to engage a fixed cam 91 having the inner end secured to the housing 69 adjacent the bottom of the latter. The outer end of the cam 91 has an arcuate cam surface 92 which cooperates with the roller 90 to return the section 67 of the arm 65 to its normal position with respect to the section 66. Return movement of the section 67 in alignment with the section 66 is accomplished as the transfer arm 65 approaches its starting position shown in Figure 12 of the drawings.

Return movement of the transfer arm 65 to its initial starting position when a trolley 36 is in the position shown in Figure 12 on the branch track 52 imparts a thrust on the trolley 36 tending to move the latter in a reverse direction or in a direction opposite the direction of the arrows 93 in Figure 12. In order to prevent reverse displacement of the trolley 36 by the transfer arm 65 as the latter is moved to its initial starting position, a dog 94 is provided. The dog 94 is pivoted intermediate the ends thereof on a bracket 95 which is turn is secured to the top flange of the branch track 52, as clearly shown in Figures 10 and 11 of the drawings. The rear end of the dog 94 is weighted in order to normally locate the dog in its operative position shown in Figure 11 and the front end of the dog is positioned to engage a part of the trolley 36 and prevent movement of the trolley 36 in a reverse direction from the position thereof shown in Figure 12. In the present instance, the inwardly extending portion 49 of the upstanding arm 48 on the trolley 36 engages the dog 94 and the top edge of the dog is inclined so that movement of the trolley 36 in the direction of the arrows 93 in Figure 12 merely swings the dog 94 out of the path of travel of the trolley 36.

Figure 10:
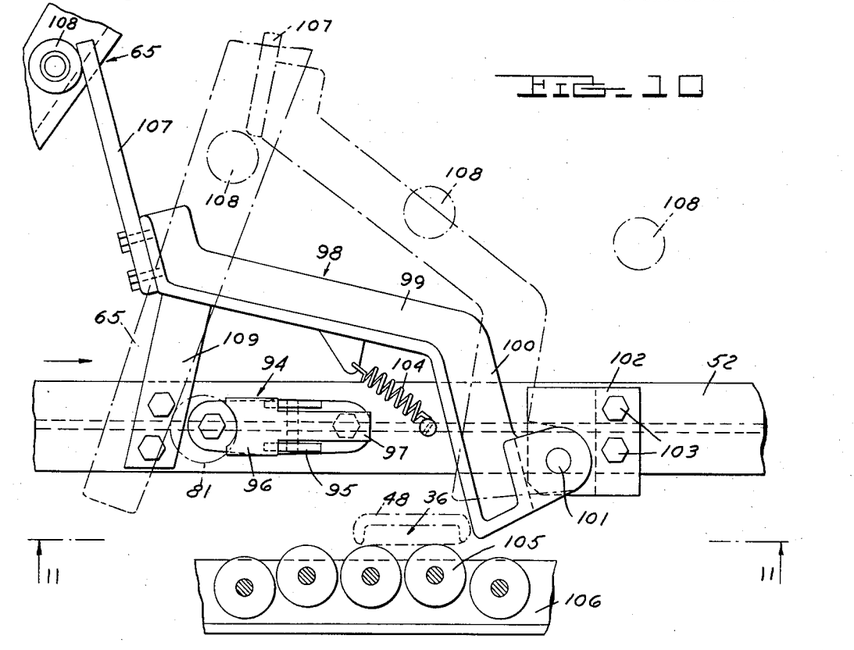
Figure 10 is an enlarged fragmentary elevational view of a part of the conveyor structure shown in Figure 1.
Figure 11:
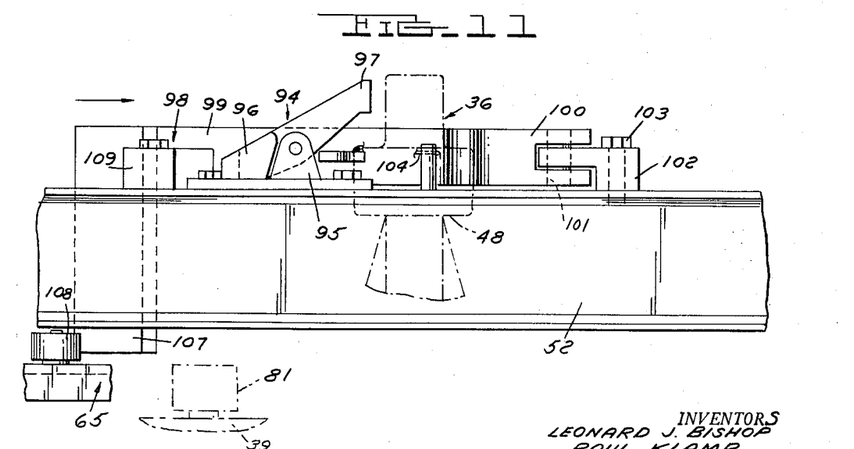
Figure 11 is an elevational view, taken along the line 11—11 on Figure 10, of the construction shown in Figure 10 with certain parts removed for the sake of clearness.

Cooperating with the dog 94 to locate a trolley 36 in the position thereof shown in Figure 12 is a stop 98. The stop 98 is in the form of an arm having angularly related portions 99 and 100. The portion 100 overlies the top of the branch track 52 and is pivoted by a pin 101 to a bracket 102 which is secured to the top of the branch track 52 by studs 103. As shown in Figure 10 of the drawings, the portion 100 of the stop arm 98 projects beyond the track into the path of travel of the upstanding arm 48 on an adjacent trolley 36 and the arm 98 is held in this position by means of a spring 104. One end of spring 104 is connected to the top of the track 52 and the other end of the spring is connected to the portion 99 of the arm 98. If desired, a plurality of guide rolls 105 may be provided on a frame structure 106 in a position to engage the upright arm 48 and prevent accidental lateral shifting movement of this arm out of the path of travel of the stop arm 98.

The end of the portion 99 of the arm 98 has a plate 107 secured thereto and it will be noted from Figure 2 of the drawings that the plate 107 projects downwardly from the stop arm 98 to a position where it is engaged by a roller 108 supported on the transfer arm 65 adjacent the free end thereof. The stop arm 98 is held in its operative position shown in Figure 10 by a plate 109 secured to the top flange of the branch track 52 and engageable with the extremity of the portion 99 of the arm 98 at the inner side of the latter.

Referring again to Figure 10 of the drawings, it will be noted that as the transfer arm 65 is swung from its initial starting position in the direction of the arrow 87 in Figure 12, the roller 108 on the transfer arm 65 abuts the bottom of the plate 107 prior to engagement of the free end of the transfer arm 65 with the roller 81 on the trolley 36. Continued swinging movement of the transfer arm 65 in the direction of the arrow 87 swings the stop arm 98 about the pin 101 in a direction against the action of the spring 104 to move the stop arm 98 out of the path of travel of the trolley 36. With the stop arm 98 in its retracted position, the trolley 36 is free to move in the direction of the arrows 93 along the branch track 52 by the transfer arm 65. It is important to note that the stops 94 and 98 cooperate with one another to hold a work carrying trolley 36 in a position on the branch track section 52 where it may be properly engaged by the transfer arm 65.

Operation

Figure 13:
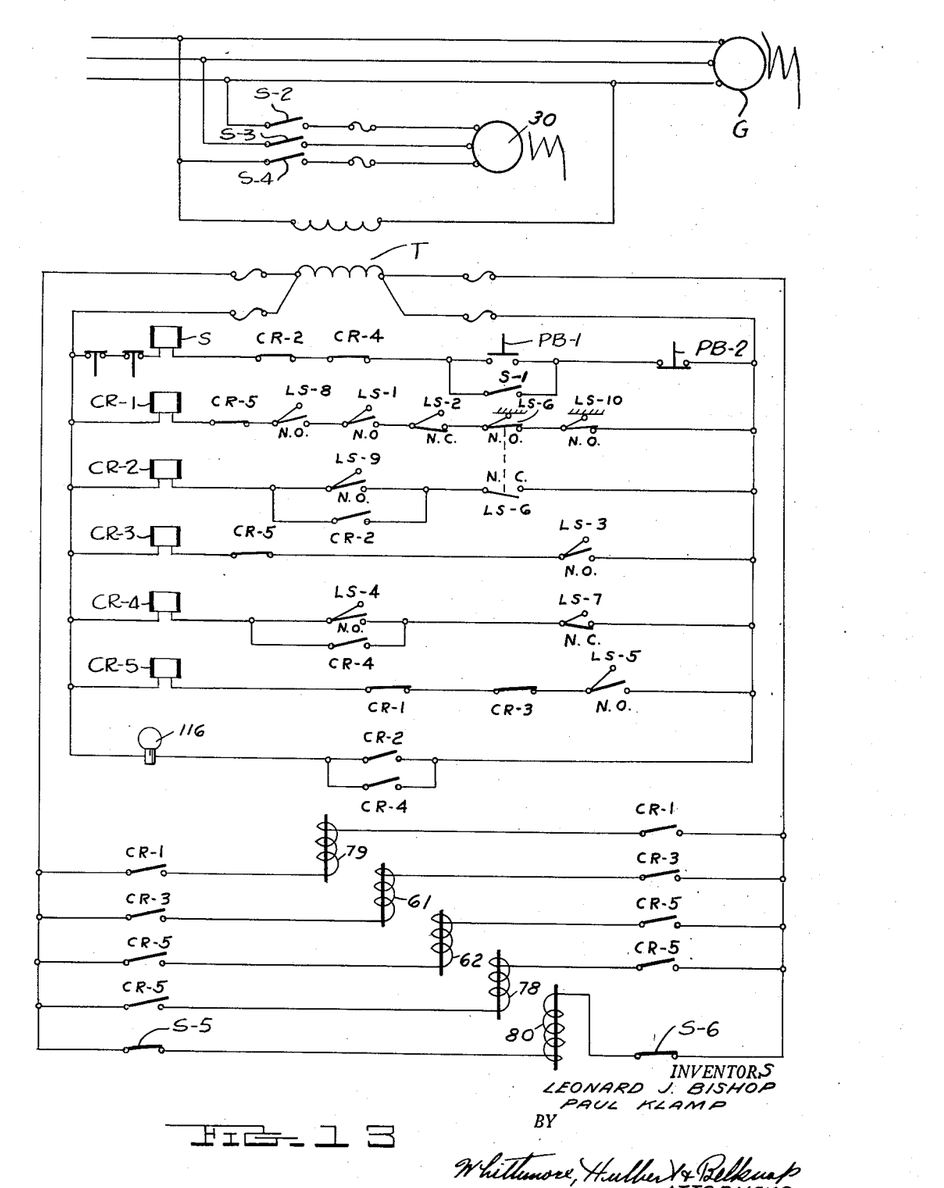
Figure 13 is an electrical wiring diagram for the conveyor structure.

The operation of the conveyor system will be more fully understood upon reference to the electrical wiring diagram shown in Figure 13 of the drawings especially when considered in connection with the diagrammatic illustration shown in Figure 12 of the drawings. The movement of the switch track section 53 and the transfer arm 65 is controlled by a roller 110 on the power operated trolley 27, a roller 111 on the work advancing driven trolley 36 and limit switches LS–1 to LS–10 inclusive.

Assuming that a power trolley 27 is propelling a driven trolley 36 in the direction of the arrow 112 in Figure 12 of the drawings, it will be noted that the roller 110 on the power trolley closes the normally open contact of limit switch LS–1 and that the roller 111 on the driven trolley simultaneously opens the normally closed contact of limit switch LS–2. It is apparent from Figure 13 that opening of the normally closed contact of limit switch LS–2 prevents energization of the control relay CR–1 even though the contact of limit switch LS–1 is being closed by roller 110. Consequently the circuit of solenoid 79 cannot be closed so that swinging movement of the arm 65 from its initial starting position shown in Figure 12 is prevented. In other words, when the limit switch LS–2 is actuated, the transfer arm 65 is rendered inoperative to move a trolley 36 from position P on the branch track 52 toward the main track 23.

On the other hand if a power trolley 27 approaching the free end of the closed switch track section 53 is unloaded or, in other words, is not propelling a driven trolley 36, it will be noted that the normally closed contact of limit switch LS–2 remains closed so that closing of the normally open contact of limit switch LS–1 energizes the control relay CR–1. It will of course be understood from the wiring diagram that closing of the control relay CR–1 circuit is also contingent on: (1) the track switch 53 being in its closed or straight line position or, in other words, the normally open limit switch contact LS–6 in the CR–1 circuit must be closed by the cam 115 on the link 58; (2) a trolley 36 must be in position P where the normally open limit switch contact LS–8 is closed by a roller 111 on the trolley 36; and (3) the transfer arm 65 must be in its start position where the normally open limit switch contact LS–10 is closed by a cam 114 on said arm.

Assuming that the above condition exists and that control relay CR–1 is energized it will be noted that the solenoid 79 is energized. Energization of solenoid 79 moves the four-way valve 76 to a position wherein the fluid motor 71 operates to swing the transfer arm 65 in the direction of the arrow 87. As the free end of the transfer arm approaches the trolley 36 on the branch track 52 at position P it releases the stop arm 98 and subsequently engages the roller 81 on the trolley 36 to move the latter along the track section 52 toward the main track 23. The speed of swinging movement of the transfer arm is timed with respect to the speed of travel of the chain 28, and a flow control valve (not shown) is associated with the fluid motor 71 for this purpose.

As the transfer arm 65 swings in the direction of the arrow 87, the normally open limit switch contact LS–3 is closed by the cam 114 and the control relay CR–3 is energized to in turn energize the solenoid coil 61. As a result the four-way valve 60 is operated to in turn operate the fluid motor 55 to swing the switch track section 53 from its straight line position to a position in registration with the branch track section 52. Should the switch track section 53 fail to reach a position in registration with the branch track section 52 in time to receive the oncoming trolley 36, the normally open limit switch contact LS–4 will be closed by the cam 114 on the transfer arm before the normally closed limit switch contact LS–7 is opened by the cam 115. Closing of limit switch contact LS–4 prior to opening of the limit switch contact LS–7 energizes the control relay CR–4 and since the relay CR–4 has a contact which shunts the limit switch contact LS–4 the relay CR–4 remains energized. Energization of relay CR–4 operates the motor starter relay S to stop the motor 30 by opening starter contacts S–2, S–3 and S–4 and to illuminate the pilot light 116. In practice, each switch track section 53 has a pilot light 116 on a common panel so that the cause of motor stoppage may be readily determined. The starter relay S is normally energized by manual push button PB–1 to initially start the motor 30, and a manual push button PB–2 is provided to open the circuit to starter relay S and shut off the motor. The starter relay S is sealed in across push button PB–1 by its contact S–1.

When the motor starter S is de-energized by the control relay CR–4, the two normally closed contacts S–5 and S–6 of the starter S close and energize the solenoid coil 80 of the three-way valve 77. The valve 77 normally connects the pressure supply line 119 to the supply line 120 leading to the valve 76, but when operated by the solenoid coil blocks the supply line 119 and connects the line 120 to the exhaust line 121. Thus operation of the fluid motor 71 to swing the transfer arm 65 is discontinued and movement of the arm 65 is stopped at the same time the motor 30 is stopped due to failure of the switch track section to register with the branch track section 52 in time to receive the approaching trolley 36.

When the fault responsible for the inability of the switch track section 53 to move into registration with the branch track section 52 is remedied and the switch section is located in registration with the branch track 52, the limit switch contact LS–7 is opened and the control relay CR–4 is de-energized. As a result the motor 30 can be re-started and energization of the motor starter S opens the contacts S–5 and S–6. Opening of the starter contacts S–5 and S–6 de-energizes the solenoid coil 80 and allows the valve 77 to return to its operative position where fluid under pressure is again supplied to the valve 76. Thus, the fluid motor 71 is again operated to resume swinging movement of the transfer arm 65.

Assuming now that the trolley 36 has been transferred by the arm 65 to a position on the main track 3 in the path of an oncoming power trolley 27, it will be noted that the normally open contact of limit switch LS–5 is closed by the cam 114 on the transfer arm 65. Closing of the contact of limit switch LS–5 energizes the control relay CR–5 which in turn energizes the solenoid coils 62 and 78. Energization of the solenoid coil 62 operates the valve 60 and fluid motor 55 to return the switch section 53 to its straight line position. On the other hand energization of the coil 78 operates the valve 76 and fluid motor 71 to return the transfer arm 65 to its initial starting position shown in Figure 12 of the drawings.

Supported to one side of the main track 23 between the limit switch LS–2 and the swinging end of the track switch section 53 is a limit switch LS–9. The limit switch LS–9 is in a circuit with CR–2 and its contact is closed by a trolley 36 moving along the main track toward the switch section 53. Also connected in the control relay CR–2 circuit is a normally closed contact of limit switch LS–6. This limit switch is actuated by dog 115 on the switch track operating link 58 when the switch track section 53 is in its straight line position, so that now the normally closed contact of limit switch LS–6 is held open. Thus closing of limit switch LS–9 has no effect on the control relay CR–2. However, should the switch track section 53 fail to move to its straight line position the normally closed contact of limit switch LS–6 would remain closed. As a result, closing of the contact of limit switch LS–9 by a trolley 36 approaching the open switch section 53 would energize control relay CR–2 and open the starter relay S of motor drive circuit to stop the conveyor. Also energizing the control relay CR–2 illuminates the pilot light 116 to indicate which of the switch tracks of the conveyor failed to operate properly. When the defect has been remedied and the switch track section 53 is moved to its straight line position, the control relay CR–2 is de-energized by opening of the normally closed contact of limit switch LS–6 through cam 115. The motor 30 may then be restarted and operation of the conveyor continued. The generator G provides the current for operating the motor 30 and for the control circuit through transformer T.

As a result of the foregoing, trolleys 36 on the respective branch track sections 52 may be readily returned to the main track 23 when desired without interrupting movement of the conveyor or power trolleys 27 and without the danger of trolleys 36 colliding or otherwise interfering with trolleys 36 on the main track 23. It will also be noted that ample safety devices are provided to assure efficient trouble free operation of the conveyor with minimum attention on the part of personnel.

What we claim as our invention is:

1. A conveyor system comprising a main track having spaced first and second sections, a branch track section supported to one side of said first track section, a switch track section normally closing the space between said main track sections and having an end pivoted to said second track section for alternately registering the opposite end thereof with the adjacent ends of said first main track section and said branch track section, work carrying driven trolleys supported by and movable along said main track, a continuous track above said main track and coextensive therewith, power operated driving trolleys carried by said continuous track and movable in a direction from said first main track section toward said second main track section and respectively engageable with the work carrying trolleys on said main track for propelling the same along said main track, control means controlled by a first driving trolley approaching the switch track section when a driven trolley is on the branch track section for moving the switch track section from a straight line position in registration with the first main track section to a position in registration with the branch track section, and means operated by a work carrying trolley when driven by a first driving trolley and operable during the normal time of operation of said control means to render said control means inoperative to swing the switch track section from its straight line position.

2. The conveyor system defined in claim 1 comprising means operated by the control means for transferring a work carrying trolley from a position on said branch track section along said switch track section to a position on the main track section in advance of the approaching first driving trolley for engagement thereby.

3. A conveyor system comprising a track section, a trolley movable along said track section, means for moving said trolley along said track section in one direction including an arm having inner and outer sections, means pivotally connecting the adjacent end portions of said inner and outer sections for relative movement about an axis parallel to the axis of swinging movement of the inner section, means pivotally supporting the inner section of the arm to one side of the track section for swinging movement in said one direction and in the opposite direction, the outer section being engageable with the trolley to move the same in said one direction, cooperating abutment means on said sections engageable with each other to prevent folding of said outer section in the said opposite direction so as to maintain the relationship of said inner and outer sections when said arm is swung in said one direction and said outer section engages and moves said trolley, said outer section being foldable about the pivotal connection between the adjacent end portions of said inner and outer sections in said one direction to enable said arm to bypass a trolley upon swinging of said arm in said opposite direction, and means engageable with the outer section only when said arm moves in the said opposite direction to swing the outer section back into relationship with the inner section.

4. The conveyor system as defined in claim 3, including a stop extending into the path of travel of the trolley for engagement by said trolley to prevent movement of the trolley in said one direction along the track section and movable out of said path of travel of release the trolley, and means on the outer section of said arm positioned for successive engagement with said stop and said trolley during movement of said arm in said one direction to retract said stop and subsequently move the trolley along said track section past said stop in said one direction.

References Cited in the file of this patent

UNITED STATES PATENTS

| | | |
|---|---|---|
| 1,760,077 | Morrison | May 27, 1930 |
| 1,865,788 | Raymond | July 5, 1932 |
| 1,875,966 | Webb et al. | Sept. 6, 1932 |
| 2,116,430 | Gordon | May 3, 1938 |
| 2,201,013 | Rosenthal | May 14, 1940 |
| 2,362,043 | Beaulieu et al. | Nov. 7, 1944 |
| 2,688,935 | Brooks | Sept. 14, 1954 |